(12) United States Patent
Kuriyama

(10) Patent No.: US 11,146,526 B2
(45) Date of Patent: Oct. 12, 2021

(54) SOCIAL NETWORKING SERVICE COLLABORATION

(71) Applicant: NEC Corporation, Tokyo (JP)

(72) Inventor: Takahiro Kuriyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/129,910

(22) Filed: Sep. 13, 2018

(65) Prior Publication Data
US 2019/0014072 A1 Jan. 10, 2019

Related U.S. Application Data

(63) Continuation of application No. 15/300,380, filed as application No. PCT/JP2015/001925 on Apr. 6, 2015.

(30) Foreign Application Priority Data

Apr. 7, 2014 (JP) .................................. 2014-078683

(51) Int. Cl.
*G06F 15/16* (2006.01)
*H04L 12/58* (2006.01)
(Continued)

(52) U.S. Cl.
CPC .............. *H04L 51/32* (2013.01); *G06F 13/00* (2013.01); *H04L 51/046* (2013.01); *H04L 67/10* (2013.01); *H04L 67/22* (2013.01)

(58) Field of Classification Search
CPC ....... H04L 51/32; H04L 51/046; H04L 67/10; G06F 13/00; G10L 13/00; G10L 13/02; G10L 13/08
(Continued)

(56) References Cited

U.S. PATENT DOCUMENTS 6,718,015 B1 4/2004 Berstis
8,294,574 B2 10/2012 Haywood
(Continued)

FOREIGN PATENT DOCUMENTS

CN 103761963 A 4/2014
JP 2000322358 A 11/2000
(Continued)

OTHER PUBLICATIONS

U.S. Office Action for U.S. Appl. No. 15/300,380 dated Feb. 25, 2019.
(Continued)

*Primary Examiner* — Kaylee J Huang

(57) ABSTRACT

A first device recognizes a user and acquires sensing data related to the user. A collaboration apparatus communicably connected with the first device, and is configured to execute transmission of a content based on the sensing data, as speech by a first virtual character registered as a member of a group in a Social Networking Service (SNS) provided by a SNS system, to the SNS system. The first virtual character represents the first device. A second device is communicably connected with the collaboration apparatus. The collaboration apparatus is configured to hold user management data in which identification information of the user of the first device is associated with the group, and register, when the second device recognizes the user, a second virtual character representing the second device with the group associated with the identification information of the user.

10 Claims, 8 Drawing Sheets

(51) Int. Cl.
*G06F 13/00* (2006.01)
*H04L 29/08* (2006.01)

(58) Field of Classification Search
USPC ........................................ 709/206, 203, 217
See application file for complete search history.

(56) References Cited

U.S. PATENT DOCUMENTS

| | | | |
|---|---|---|---|
| 8,315,994 B2 | 11/2012 | Robert | G06F 17/30979 |
| | | | 707/694 |
| 8,447,285 B1* | 5/2013 | Bladon | H04L 51/32 |
| | | | 455/414.4 |
| 8,861,798 B2 | 10/2014 | Gao | G06K 9/00979 |
| | | | 235/382 |
| 9,147,054 B1 | 9/2015 | Beal | G06F 21/32 |
| 9,330,666 B2 | 5/2016 | Alameh et al. | |
| 10,555,393 B1* | 2/2020 | Fu | H05B 47/105 |
| 2002/0076003 A1 | 6/2002 | Zellner et al. | |
| 2003/0046689 A1 | 3/2003 | Gaos | |
| 2004/0153211 A1 | 8/2004 | Kamoto et al. | |
| 2004/0243281 A1 | 12/2004 | Fujita et al. | |
| 2006/0094938 A1 | 5/2006 | Shimada et al. | |
| 2006/0155765 A1 | 7/2006 | Takeuchi et al. | |
| 2008/0018737 A1 | 1/2008 | Suzuki et al. | |
| 2009/0146795 A1 | 6/2009 | Matsumoto et al. | |
| 2009/0312869 A1 | 12/2009 | Ohnaka | |
| 2010/0010669 A1 | 1/2010 | Lee et al. | |
| 2010/0036912 A1 | 2/2010 | Rao | |
| 2010/0076767 A1 | 3/2010 | Vieri et al. | |
| 2012/0150966 A1 | 6/2012 | Fan et al. | |
| 2012/0151100 A1* | 6/2012 | Roche | G06F 13/10 |
| | | | 710/16 |
| 2012/0151383 A1 | 6/2012 | Kazan et al. | |
| 2012/0154155 A1 | 6/2012 | Brasch | |
| 2012/0162346 A1 | 6/2012 | Watanabe et al. | |
| 2012/0201362 A1 | 8/2012 | Crossan et al. | |
| 2013/0023738 A1 | 1/2013 | Chang et al. | |
| 2013/0031167 A1* | 1/2013 | Furukawa | G06Q 30/02 |
| | | | 709/203 |
| 2013/0041976 A1 | 2/2013 | Hendricks et al. | |
| 2013/0078600 A1 | 3/2013 | Fischer et al. | |
| 2013/0218346 A1 | 8/2013 | Root | |
| 2013/0268119 A1 | 10/2013 | Weinberg et al. | |
| 2013/0346867 A1 | 12/2013 | Woods et al. | |
| 2014/0026157 A1 | 1/2014 | Wang et al. | |
| 2014/0068091 A1 | 3/2014 | T. et al. | |
| 2014/0136591 A1 | 5/2014 | Hoberman | |
| 2014/0143149 A1 | 5/2014 | Aissi | G06F 21/31 |
| | | | 705/44 |
| 2014/0143334 A1 | 5/2014 | Jung | G06Q 50/01 |
| | | | 709/204 |
| 2014/0143352 A1 | 5/2014 | Yegnashankaran | H04L 51/32 |
| | | | 709/206 |
| 2014/0157151 A1 | 6/2014 | Westmoreland | H04L 65/403 |
| | | | 715/753 |
| 2014/0192134 A1 | 7/2014 | Jung et al. | |
| 2014/0288950 A1 | 9/2014 | Park et al. | |
| 2014/0304356 A1 | 10/2014 | Allen, Sr. et al. | |
| 2014/0372520 A1* | 12/2014 | Takahashi | G06F 21/10 |
| | | | 709/203 |
| 2014/0379828 A1* | 12/2014 | Zou | H04L 65/1093 |
| | | | 709/206 |
| 2015/0077567 A1 | 3/2015 | Scalisi | |
| 2015/0120851 A1 | 4/2015 | Kimura | H04L 51/32 |
| | | | 709/206 |
| 2015/0148620 A1 | 5/2015 | Roy et al. | |
| 2016/0155317 A1 | 6/2016 | Rostami | |
| 2016/0270717 A1 | 9/2016 | Luna et al. | |

FOREIGN PATENT DOCUMENTS

| | | | | |
|---|---|---|---|---|
| JP | 2009-194766 A | 8/2009 | | |
| JP | 2012-086945 A | 5/2012 | | |
| JP | 2013-037512 A | 2/2013 | | |
| JP | 2013-127399 A | 6/2013 | | |
| WO | 2012/172721 A1 | 12/2012 | | |
| WO | 2014/013447 A2 | 1/2014 | | |
| WO | WO-2014013447 A2 * | 1/2014 | | G09B 21/005 |

OTHER PUBLICATIONS

NEC Corparation, "Better People"[online], [searched Mar. 24, 2014], the Internet <URL:http://n-pj.jp/btp/>.

NEC Corporation "Cloud Collaborative Robot Platform", [online], [searched Apr. 3, 2014], the Internet <URL:http://jpn.nec.com/robot/>.

International Search Report for PCT Application No. PCT/JP2015/001925, dated Jun. 23, 2015.

English translation of Written opinion for PCT Application No. PCT/JP2015/001925.

Takahashi, T., et al., "A Social Media Mediation Robot to Increase an Opportunity of Conversation for Elderly: Mediation Experiments Using Single or Multiple Robots", IEICE Technical Report, vol. 113 No. 84, Jun. 7, 2013, pp. 31-36 (6 pages).

Communication dated Sep. 5, 2017, from the Japanese Patent Office in counterpart Japanese application No. 2016-512601.

U.S. Office Action for U.S. Appl. No. 15/300,380 dated Jun. 14, 2019.

U.S. Office Action for U.S. Appl. No. 15/300,380 dated Sep. 14, 2018.

U.S. Office Action for U.S. Appl. No. 16/129,959 dated Mar. 9, 2020.

U.S. Office Action for U.S. Appl. No. 16/129,937 dated Apr. 29, 2020.

U.S. Office Action for U.S. Appl. No. 16/129,959 dated Sep. 29, 2020.

U.S. Office Action and PTO-892 for U.S. Appl. No. 16/129,959 dated Mar. 9, 2021.

U.S. Office Action for U.S. Appl. No. 15/300,380 dated Jun. 4, 2020.

U.S. Office Action for U.S. Appl. No. 15/300,380 dated Mar. 25, 2021.

U.S. Office Action for PTO-892 for U.S. Appl. No. 17/060,304 dated May 11, 2021.

U.S. Office Action and PTO-892 for U.S. Appl. No. 17/060,270 dated May 7, 2021.

* cited by examiner

SOCIAL NETWORKING SERVICE COLLABORATION

CROSS-REFERENCE TO RELATED APPLICATIONS

The present application is a continuation application of U.S. patent application Ser. No. 15/300,380 filed on Sep. 29, 2016, which is a National Stage Entry of international application PCT/JP2015/001925, filed Apr. 6, 2015, which claims the benefit of priority from Japanese Patent Application 2014-078683 filed on Apr. 7, 2014, the disclosures of all of which are incorporated in their entirety by reference herein.

TECHNICAL FIELD

The present invention relates to a collaboration system which provides collaboration between an SNS system and a device, a collaboration apparatus, a collaboration method, a recording medium which stores a collaboration program, and the like.

BACKGROUND ART

In recent years, as SNS (Social Networking Service) has been used for communication with close family members or friends, communities have been built using SNS. In common SNS, a user uses a browser or an application executed on a terminal such as a PC (Personal Computer) or a smart phone to browse or upload contents such as messages, pictures and moving pictures in an SNS community.

With various proposals made for allowing easy transmission and reception of contents in an SNS community, software implementation has been executed which is operative on a terminal such as a PC or a smart phone to use SNS. For example, such a technique is used as enables a user to transmit and receive a message with ease using text input by voice input and voice reading of displayed text in an application on the terminal. For example, Better People (see Non-Patent Literature 1) is used as a bulletin-board-like SNS allowing a contribution of a status (i.e. status contribution) indicative of a state of a user himself or herself and contribution to the status contribution (i.e. comment contribution).

On the other hand, communication robots are being widespread, which are capable of communicating with people through conversation (see e.g. Non-Patent Literature 2). Through conversation with a person, a communication robot is capable of sensing a large amount of information such as contents of the conversation, a position and a movement of the person, a shape and an expression of a face, a body temperature of the person and a surrounding temperature. With the large amount of information, the communication robot is allowed to continue the conversation with the person.

CITATION LIST

Non-Patent Literature

[NPL 1] NEC Corporation, "Better People" [online], [searched Mar. 24, 2014], the Internet <URL: http://n-pj.jp/btp/>
[NPL 2] NEC Corporation, "Cloud Collaborative Robot Platform", [online], [searched Apr. 3, 2014], the Internet <URL: http://jpn.nec.com/robot/>

SUMMARY OF INVENTION

Technical Problem

Common SNS is, however, premised on that a user uses a terminal such as a PC or a smart phone. Aged persons, infants and others who are difficult to use these terminals are not allowed to join in an SNS community. Even when a user can use these terminals, he/she could not transmit and receive the contents in an SNS community with ease. The reason is that complicated procedure is required for transmission and reception of contents in an SNS community, including an access to an SNS community, browsing of contents, text input and image or video contents uploading work.

One of objects of the present invention is to provide a collaboration system, a collaboration apparatus and a collaboration method which allow a user to use SNS with ease, a recording medium which stores a collaboration program, and the like.

Solution to Problem

A collaboration system according to one aspect of the present invention includes a device which recognizes a user to execute at least one of acquisition of sensing data related to the user and action based on the contents contributed to SNS by another user, and a collaboration apparatus which executes at least one of processing of transmitting contributed contents based on the sensing data to an SNS system which provides SNS and processing of updating action of the device based on contents contributed by another user and transmitting the updated action to the device.

A collaboration apparatus according to one aspect of the present invention, which is a collaboration apparatus connected to a device which recognizes a user to execute at least one of acquisition of sensing data related to the user and action based on the contents contributed to SNS by another user, executes at least one of processing of transmitting contributed contents based on the sensing data to an SNS system which provides the SNS and processing of updating action of the device based on contents contributed by another user and transmitting the updated action to the device.

A collaboration method according to one aspect of the present invention includes recognizing a user to execute at least one of acquisition of sensing data related to the user and action based on the contents contributed to SNS by another user, and executing at least one of processing of transmitting contributed contents based on the sensing data to an SNS system which provides the SNS and processing of updating action based on contents contributed by another user.

A recording medium according to one aspect of the present invention stores a collaboration program, which program is installed in a computer connected to a device that recognizes a user to execute at least one of acquisition of sensing data related to the user and action based on the contents contributed to SNS by another user and which program causes the computer to execute at least one of processing of transmitting contributed contents based on the sensing data to an SNS system which provides the SNS and processing of updating action of the device based on contents contributed by another user and transmitting the updated action to the device. An object of the present invention is attained also by the collaboration program stored in the above-described recording medium.

Advantageous Effects of Invention

According to the present invention, a user is allowed to use SNS with ease.

DESCRIPTION OF EMBODIMENTS

Figure 1:
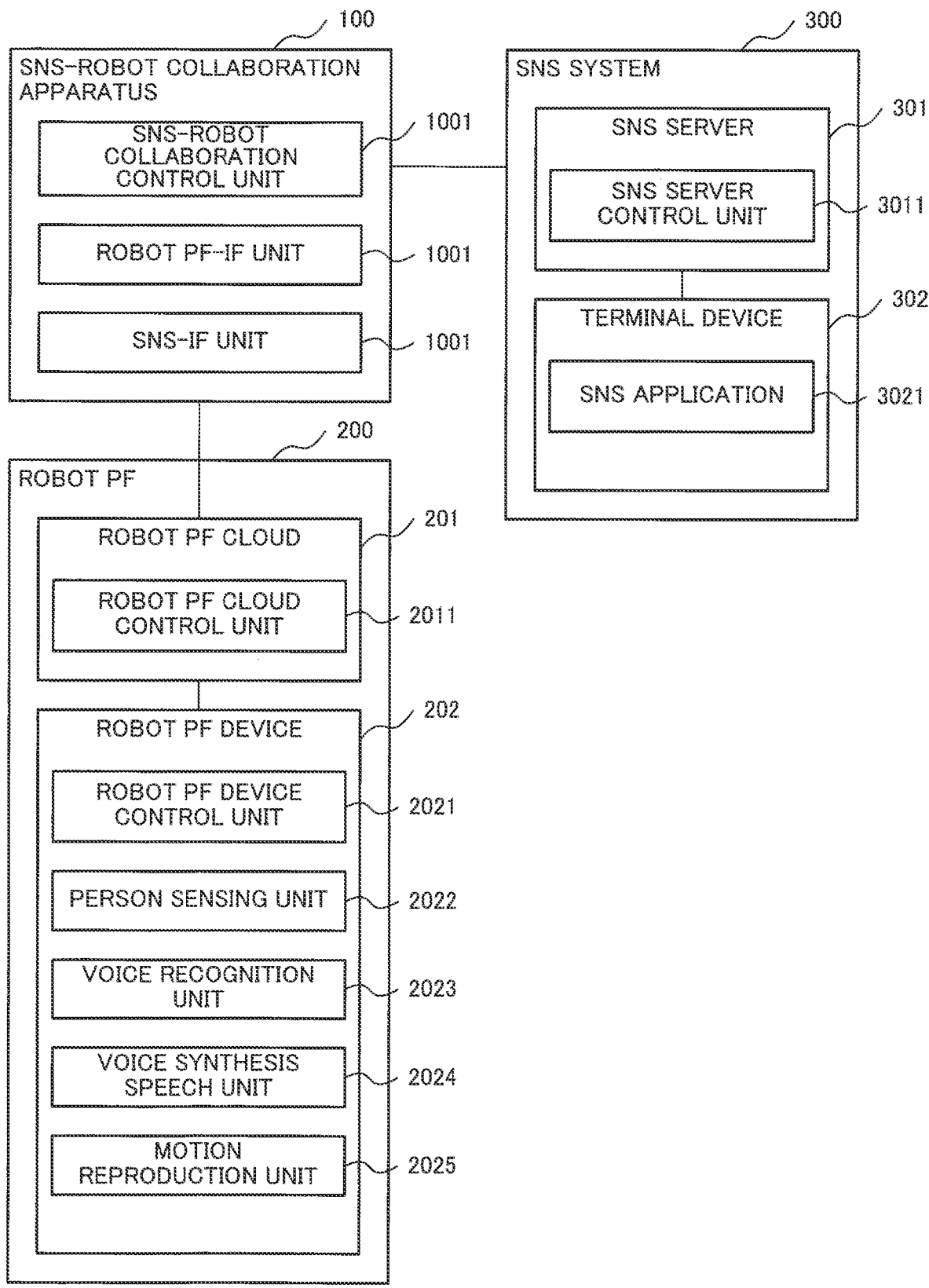
FIG. 1 is a block diagram illustrating a structure of an exemplary embodiment of a collaboration system according to the present invention.

In the following, an exemplary embodiment of a collaboration system according to the present invention will be described with reference to the drawings. FIG. 1 is a block diagram illustrating a structure of the collaboration system according to the present exemplary embodiment. The collaboration system illustrated in FIG. 1 is a system in which a robot platform and a system realizing SNS are collaborated.

As illustrated in FIG. 1, the collaboration system of the present exemplary embodiment includes an SNS-robot collaboration apparatus 100, a robot PF (Platform) 200 and an SNS system 300. The SNS-robot collaboration apparatus 100 corresponds, for example, to a collaboration apparatus of the present invention. The robot PF 200 corresponds, for example, to a device of the present invention. The SNS-robot collaboration apparatus 100 is an apparatus connected between the robot PF 200 and the SNS system 300 so as to communicate therewith. The SNS-robot collaboration apparatus 100 is, for example, a server.

The robot PF 200 includes a robot PF cloud 201 and a robot PF device 202. The robot PF cloud 201 and the robot PF device 202 are connected through a communication network.

The SNS system 300 includes an SNS server 301 and a terminal apparatus 302. The SNS system 300 provides SNS. The SNS server 301 and the terminal apparatus 302 are connected through the communication network. The terminal apparatus 302 is a terminal apparatus which is used in a common SNS system. The terminal apparatus 302 is, for example, a PC, a tablet terminal, a smart phone, a cellular phone or the like which is connected to the SNS server 301 through the communication network. In the present exemplary embodiment, the plurality of terminal apparatuses 302 is assumed to be connected to the SNS server 301.

The SNS-robot collaboration apparatus 100 includes an SNS-robot collaboration control unit 1001, a robot PF-IF (Interface) unit 1002 and an SNS-IF unit 1003. The SNS-robot collaboration apparatus 100 is connected to the robot PF cloud 201 and the SNS server 301 on a cloud via the communication network. The SNS-robot collaboration apparatus 100 may be included in the robot PF cloud 201 or the SNS system 300. The SNS-robot collaboration apparatus 100 conducts communication with the robot PF cloud 201 via the communication network through the robot PF-IF unit 1002. The SNS-robot collaboration apparatus 100 conducts communication with the SNS server 301 via the communication network through the SNS-IF unit 1003.

Each element in the SNS-robot collaboration apparatus 100 is achieved by, for example, hardware designed to execute specific arithmetic processing and the like, or an information processing device such as a CPU (Central Processing Unit) operable according to a program. The program is stored in a non-transitory computer-readable storage medium.

The robot PF cloud 201 is an information processing device such as a server which is used for cloud service. The robot PF cloud 201 includes a robot PF cloud control unit 2011. The robot PF cloud control unit 2011 controls the entire robot PF 200 (both the robot PF cloud 201 and the robot PF device 202). The robot PF cloud control unit 2011 is capable of, for example, managing the robot PF device 202. The robot PF cloud control unit 2011 also has such a function as an application programming interface which is an interface for controlling and managing a robot from other service application and the like.

The robot PF device 202 is, for example, a communication robot capable of communicating with a user. In the following description, the communication robot is also referred to as a robot. The robot PF device 202 includes a robot PF device control unit 2021, a person sensing unit 2022, a voice recognition unit 2023, a voice synthesis speech unit 2024 and a motion reproduction unit 2025. The robot PF device 202 acquires sensing data related to a user by using the person sensing unit 2022, the voice recognition unit 2023 and the like. In the following description, a user of the communication robot is also referred to as a robot user.

The person sensing unit 2022 senses a person. Specifically, the person sensing unit 2022 acquires sensing data related to a user of the communication robot, for example, by a sensor. The voice recognition unit 2023 detects voice, for example, by a sensor such as a microphone and recognizes the detected voice. The voice synthesis speech unit 2024 synthesizes voice based on speech contents indicative of contents of the speech and reproduces the synthesized voice. The motion reproduction unit 2025 operates the robot according to the motion contents indicative of movement of the robot (i.e. reproduces motion contents).

Although the present exemplary embodiment is premised on the cloud collaborative robot PF 200 having the robot PF cloud 201 and the robot PF device 202, it is not limited to such a structure. The robot PF device 202 may be, for example, a robot that can be controlled and managed from another application and the like. In addition, the robot PF cloud 201 may execute software processing such as person sensing, voice recognition and voice synthesis executed in the person sensing unit 2022, the voice recognition unit 2023 and the voice synthesis speech unit 2024. In other words, the robot PF cloud 201 may operate as the person sensing unit 2022, the voice recognition unit 2023 and the voice synthesis speech unit 2024.

Although in the present exemplary embodiment, the communication robot is used as the robot PF device 202, the robot PF device 202 is not necessarily the communication robot, but may be any device that can recognize a person. For example, a camera capable of face recognition and matching or a sensor device capable of biometric authentication may be used in place of the communication robot.

Sensing a person with the person sensing unit 2022 is realized by such sensing techniques as detection of a temperature change by an infrared sensor, detection of a distance to an object by an ultrasonic sensor and detection of a person's face using a photographing apparatus such as a camera. Since common techniques are applied as the sensing technique, detailed description thereof will be omitted.

Each element of the robot PF cloud 201 and the robot PF device 202 is achieved, for example, by hardware designed to execute specific arithmetic processing and the like, or an information processing device such as a CPU operable according to a program. The program is stored in a non-transitory computer-readable storage medium.

The SNS server 301 is a server which executes service operation and data management of the SNS system 300 on the cloud and includes an SNS server control unit 3011. An application installed in such a terminal as a PC or a smart phone is allowed to access data of the SNS system 300 by using the application programming interface provided by the SNS server control unit 3011.

In the description of each exemplary embodiment of the present invention, an application program is referred to as "application" as described above in some cases. In addition, operation of the information processing device such as a CPU operable according to the application program will be described as operation of an application program, i.e. an application as described above in some cases.

The terminal apparatus 302 includes an SNS application 3021. The SNS application 3021 is an application installed in a terminal such as a PC or a smart phone. The SNS application 3021 is an application such as a Web browser that can use SNS. The SNS application 3021 may be achieved by a dedicated circuit. The terminal apparatus 302 may be any of various apparatuses or systems that can use SNS.

As described in the foregoing, the SNS server 301 and the terminal apparatus 302 are achieved, for example, by hardware designed to execute specific arithmetic processing and the like, or an information processing device such as a CPU operable according to a program. The program is stored in a non-transitory computer-readable storage medium.

The SNS application 3021 of the present exemplary embodiment is an SNS application which enables users to share their own states or comments they want to send by using an UI (User Interface) called a status icon or a stamp. The SNS application 3021 is a bulletin-board-like SNS enabling, for example, contribution of a status indicative of a user's own state (i.e. status contribution) and contribution to the status contribution (i.e. comment contribution). As such SNS, for example, Better People (see Non-Patent Literature 1) is used. Better People has an icon indicative of a user's state (i.e. status icon), and a stamp usable in place of text.

When sharing words and actions of a robot user in SNS, the SNS application 3021 discriminates contents that the user wants to share with another user relatively intensively (e.g. status contribution) and contents that the user wants to share relatively weakly (e.g. comment contribution). The SNS application 3021 displays the contents to be shared relatively intensively and contents to be shared relatively weakly using different UIs (i.e. ways of showing).

The communication robot joins in a community of the SNS system 300 as a virtual robot character. In the present exemplary embodiment, a community of the SNS system 300 and an SNS group are synonyms. In the SNS group, only a particular user who takes part in the group is allowed to contribute and read the contents. For joining in an SNS group, a user needs registration after being approved by a group manager. In common SNS, a community of a closed world for communicating with close family members and friends is defined as a group in many cases. Therefore, also in the present exemplary embodiment, a community of the SNS system 300 is referred to as an SNS group or simply a group. In the following description, "contribution to an SNS group" is contribution, for example, which can be read only by users taking part in the SNS group. "SNS contribution" is contribution to any of SNS groups. The SNS contribution includes, for example, the above-described status contribution and comment contribution.

The communication robot contributes contents of conversation with a robot user as a comment or a stamp via a virtual robot character joining in an SNS group. In other words, the communication robot contributes contents of conversation with the robot user as a comment or a stamp put by the virtual robot character taking part in the SNS group. This allows another SNS user to share a condition of the robot user in the SNS. In addition, by making a speech of the contents contributed by another SNS user in the SNS group through voice synthesis or executing motion by the communication robot enables the robot user to be informed of a condition of another SNS user. Motion includes, for example, sound effects, body movement of the communication robot, and lighting or blinking of an LED (Light Emitting Diode). Use of motion allows the communication robot to have more effective communication with the robot user than communication by speech voice only. In the following description, data indicative of contents of a specific speech is referred to as speech contents. Data representing contents of specific motion is referred to as motion contents. At least one of speech and motion is referred to as "action" in some cases.

Figure 2:
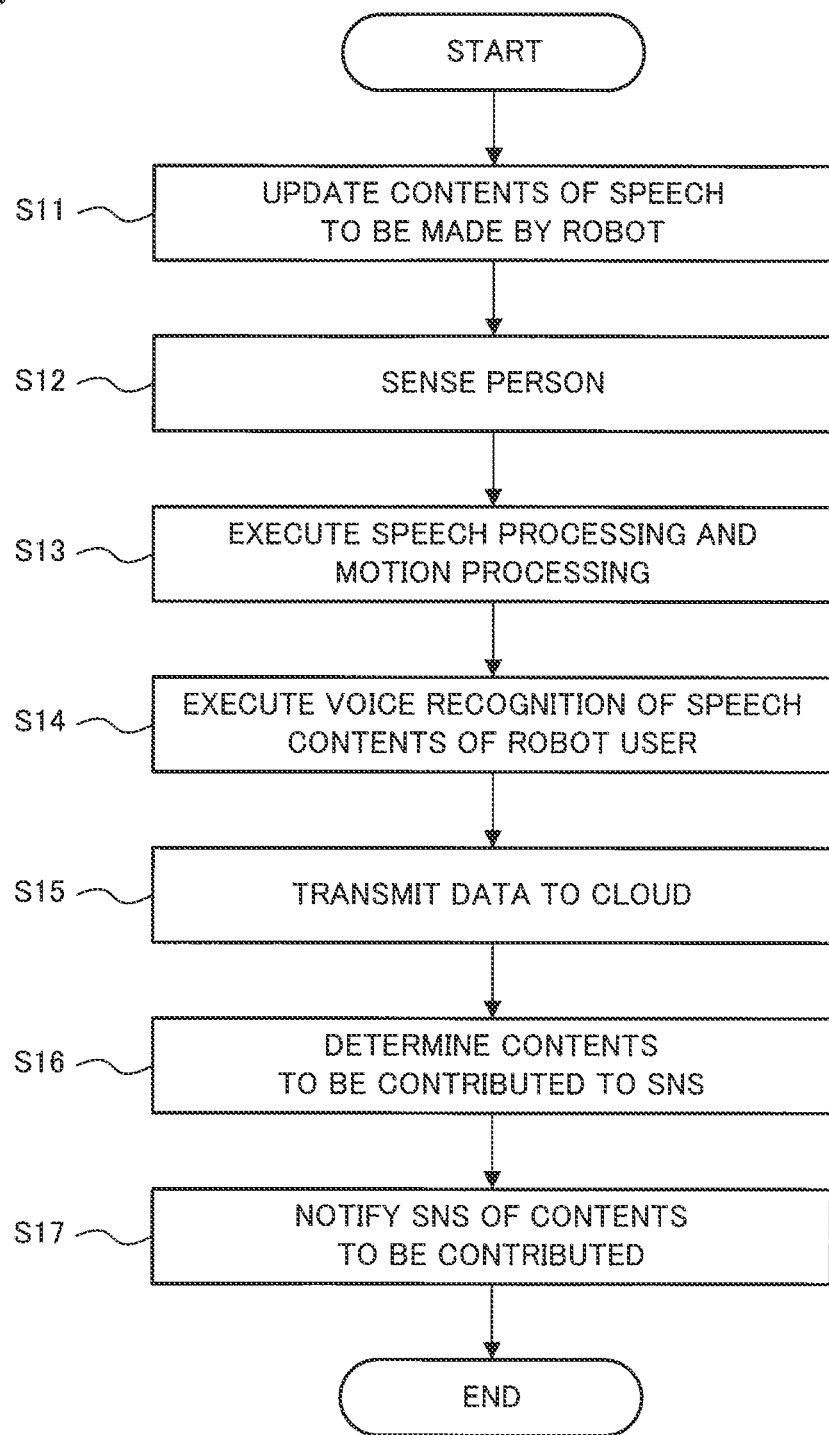
FIG. 2 is a flowchart illustrating operation of the exemplary embodiment of the collaboration system according to the present invention.

Next, operation of the collaboration system of the present exemplary embodiment will be described. FIG. 2 is a flowchart illustrating operation of the collaboration system as the present exemplary embodiment. Specifically, FIG. 2 is a flowchart depicting a procedure by which the communication robot contributes contents of conversation with the robot user as a comment or a stamp in an SNS group via a virtual robot character taking part in an SNS group.

The SNS-robot collaboration control unit 1001 updates contents (i.e. speech contents) of a speech made by the communication robot (Step S11). The SNS-robot collaboration control unit 1001 also notifies the robot PF cloud control unit 2011 of update information about the speech contents through the robot PF-IF unit 1002. The robot PF cloud control unit 2011 notifies the robot PF device control unit 2021 of the update information about the speech contents notified by the SNS-robot collaboration control unit 1001. Update of the contents of the speech made by the robot is executed by the SNS-robot collaboration control unit 1001 as required. Specific update procedure will be described separately.

The person sensing unit 2022 senses a person (Step S12). In other words, the person sensing unit 2022 acquires measurement data (i.e. sensing data) related to a robot user by a sensor. Specifically, the person sensing unit 2022 senses a presence, a position, movement, an expression change of a person, a temperature change, and the like. The person sensing unit 2022 notifies the robot PF device control unit 2021 of sensing data acquired by the sensing. Person sensing is achieved by such sensing techniques as detection of a temperature change by an infrared sensor, detection of a distance to an object by an ultrasonic sensor and detection of a person's face by a camera.

The robot PF device control unit 2021 causes the voice synthesis speech unit 2024 to execute speech processing and the motion reproduction unit 2025 to execute motion processing (Step S13). Specifically, the robot PF device control unit 2021 determines speech contents and motion contents of a robot based on sensing data acquired by person sensing. Next, the robot PF device control unit 2021 notifies the speech contents of the robot to the voice synthesis speech unit 2024 and the motion contents of the robot to the motion reproduction unit 2025. The voice synthesis speech unit 2024 makes a speech of the notified speech contents. In other words, the voice synthesis speech unit 2024 synthesizes voice representing the notified speech contents. The voice synthesis speech unit 2024 generates voice data representing the notified speech contents and reproduces the generated voice data as voice. The motion reproduction unit 2025 reproduces the notified motion contents. In other words, the motion reproduction unit 2025 executes motion expressed by the notified motion contents.

The robot PF device control unit 2021 selects either one of speech contents, i.e. the speech contents held in advance and the speech contents notified from the SNS-robot collaboration control unit 1001 in Step S11. The robot PF device control unit 2021 determines the selected speech contents as speech contents of which the robot will make a speech. The robot PF device control unit 2021 also selects any of motion contents held in advance as motion contents. The robot PF device control unit 2021 determines the selected motion contents as motion contents to be reproduced by the robot. The robot PF device control unit 2021 may determine the speech contents and the motion contents of the robot based, not on person sensing, but on detection of specific sound or specific voice, detection of gesture movement, or the like. Specific method of determining speech contents and motion contents will be described separately.

The voice recognition unit 2023 recognizes speech contents of the robot user by voice recognition after the speech and the motion made by the robot in Step S13 (Step S14). The voice recognition unit 2023 notifies, as sensing data, voice recognition data which is acquired by voice recognition and represents speech contents of the robot user to the robot PF device control unit 2021.

The robot PF device control unit 2021 transmits sensing data acquired from the person sensing unit 2022 and the voice recognition unit 2023 and device data related to the robot PF device 202 to the robot PF cloud control unit 2011 (Step S15). Specifically, the sensing data includes infrared measurement data, ultrasonic wave measurement data, camera face detection data, camera image and video data, voice recognition data and the like. The device data specifically includes a device state, speech contents representing contents of a speech made by the robot, motion reproduction contents (i.e. reproduced motion contents) and the like.

The robot PF cloud control unit 2011 notifies the sensing data and the device data notified from the robot PF device control unit 2021 to the SNS-robot collaboration control unit 1001 through the robot PF-IF unit 1002.

The SNS-robot collaboration control unit 1001 determines contents to be contributed by the virtual robot character in the SNS group based on the sensing data and the device data notified from the robot PF cloud control unit 2011 (Step S16). In other words, in Step S16, the SNS-robot collaboration control unit 1001 determines contents to be contributed by the virtual robot character to the SNS. Specific contents of the determination method in Step S16 will be described separately.

The SNS-robot collaboration control unit 1001 notifies the SNS server control unit 3011 of the contribution contents determined as contents to be contributed by the virtual robot character (Step S17). In other words, in Step S17, the SNS-robot collaboration control unit 1001 notifies the SNS of the contribution contents. Specifically, the SNS-robot collaboration control unit 1001 transmits the contribution contents determined in Step S16 to the SNS server control unit 3011 through the SNS-IF unit 1003. The SNS server control unit 3011 updates the contribution contents data in the SNS system 300 and notifies the update contents of contribution contents data to the SNS application 3021 as required.

By the foregoing processing, the contribution contents determined by the SNS-robot collaboration control unit 1001 are contributed to SNS by the virtual robot character and shared. The contribution contents are contents based on sensing data and device data including contents of conversation with the robot user and sensing information such as movement of the robot user. Then, another SNS user is allowed to confirm the contribution contents as contents contributed by the virtual robot character in the SNS group.

Figure 3:
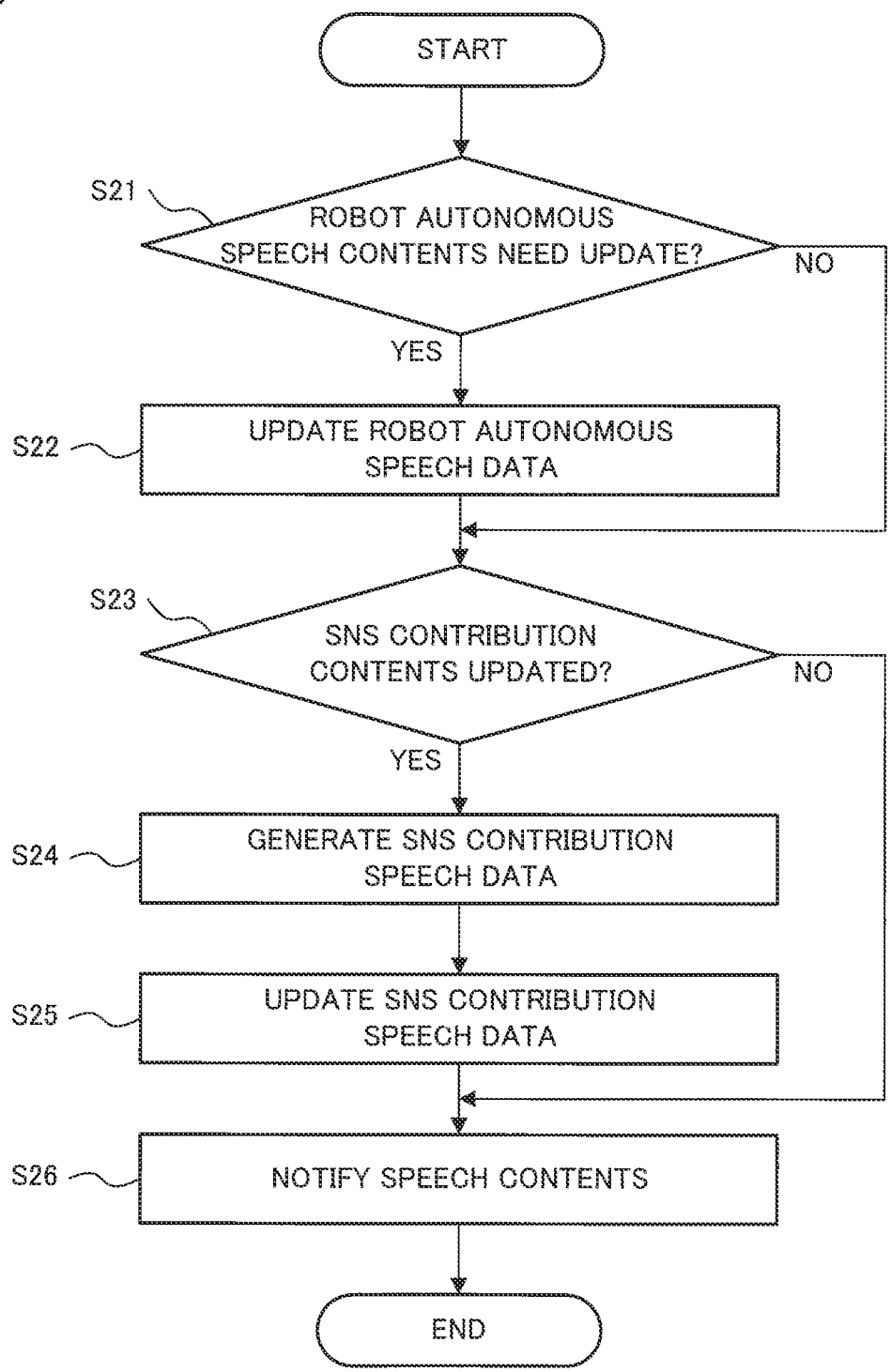
FIG. 3 is a flowchart illustrating a procedure of updating speech contents of a communication robot.

Next, update of the speech contents in Step S11 will be specifically described. FIG. 3 is a flowchart illustrating a procedure of updating speech contents of the communication robot.

Speech of the communication robot includes two types of speeches, a robot autonomous speech and an SNS contribution speech. The robot autonomous speech is a speech which is autonomously made by the communication robot itself and is addressed to a robot user irrespective of the contents contributed in the SNS group. The robot autonomous speech is a speech, for example, "Good morning. I'm fine today as well. Let's go." or "Hello, how are you today?" The SNS contribution speech is a speech based on the contents contributed by a certain user in the SNS group. When a certain user of the SNS group makes a contribution, the SNS-robot collaboration control unit 1001 may change the speech of the communication robot from a robot autonomous speech to an SNS contribution speech. An SNS contribution speech acquired when the speech "Hello, it's cold again today, isn't it?" was contributed by a "user A" as one of the users will be a speech, for example, "Comment from the user A. Hello, 'it's cold again today, isn't it?'" The communication robot only needs to inform a robot user of a speech changed by the SNS-robot collaboration control unit 1001.

In the following, description will be made of a procedure of updating contents of each of a robot autonomous speech and an SNS contribution speech with reference to FIG. 3.

The SNS-robot collaboration control unit 1001 checks whether update of data representing the contents of speech that the robot autonomously makes (i.e. robot autonomous speech data) is required or not (Step S21). When the update is required (YES in Step S21), the SNS-robot collaboration control unit 1001 updates the robot autonomous speech data (Step S22). When the update is not required (NO in Step S21), robot autonomous speech data is not updated in Step S22 and the operation transfers to Step S23.

The robot autonomous speech data is data held in advance by the SNS-robot collaboration control unit 1001. The robot autonomous speech data may be periodically updated. The robot autonomous speech data is updated according to an update instruction by, for example, a robot manager or a robot service provider. In addition, the SNS-robot collaboration control unit 1001 may be set so as to autonomously update robot autonomous speech data based on information, such as weather, temperature or news, on the Internet or the like. In other words, for example, when periodical update timing comes, upon reception of an update instruction, or when information on the Internet or the like is updated, the SNS-robot collaboration control unit 1001 may determine that update of the contents of a speech that the robot autonomously makes is required.

The SNS-robot collaboration control unit 1001 checks whether a contribution to the SNS group whose speech is not yet made by the robot is updated or not (Step S23). In the following, contents contributed to the SNS group are referred to as "SNS contribution contents". When updated (YES in Step S23), based on the updated SNS contribution contents, the SNS-robot collaboration control unit 1001 generates SNS contribution speech data, which is data representing the contents of an SNS contribution speech (Step S24). When not updated (NO in Step S23), contribution speech data is not generated in Step S24, and the operation illustrated in FIG. 3 transfers to Step S26.

In Step S24, the SNS-robot collaboration control unit 1001 generates SNS contribution speech data according to a template held in advance. Specifically, the SNS-robot collaboration control unit 1001 holds in advance speech patterns depending on contributors, contributed text contents, contributed status icons (icons each representing a user state), and contributed stamps. The SNS-robot collaboration control unit 1001 uses, as a template, a management table by which speech data can be generated based on the speech patterns. For example, when the user A contributes a text "Hello, it's cold again today, isn't it?", the SNS-robot collaboration control unit 1001 generates speech data "Comments from user A. Hello, it's cold again today, isn't it?" When one of the users, a user B contributes a stamp meaning "OK", the SNS-robot collaboration control unit 1001 generates speech data "OK, OK. The user B has put an OK stamp".

Using the generated SNS contribution speech data, the SNS-robot collaboration control unit 1001 updates the SNS contribution speech data which the SNS-robot collaboration control unit 1001 holds (Step S25). The SNS contribution speech data held by the SNS-robot collaboration control unit 1001 may include a plurality of SNS contribution contents whose speech is yet to be made by the robot. The SNS contribution speech data held by the SNS-robot collaboration control unit 1001 also includes data from which a speech has been made by the robot, and may be data which is generated in Step S24 and accumulated and from which a speech has been already made.

The SNS-robot collaboration control unit 1001 notifies the robot PF device control unit 2021 of the robot autonomous speech data and the SNS contribution speech data (i.e. speech contents) (Step S26). Specifically, through the robot PF-IF unit 1002, the SNS-robot collaboration control unit 1001 notifies the robot PF cloud control unit 2011 of the robot autonomous speech data from which the communication robot makes a speech and the SNS contribution speech data. Then, the robot PF cloud control unit 2011 notifies the robot PF device control unit 2021 of the robot autonomous speech data and the SNS contribution speech data notified by the SNS-robot collaboration control unit 1001. When neither the robot autonomous speech data nor the SNS contribution speech data is updated, no notification is made in Step S26.

Although, in the present exemplary embodiment, the SNS-robot collaboration control unit 1001 executes update of the robot autonomous speech data and update of the SNS contribution speech data in succession, they are not necessarily executed in succession. For example, when update of the robot autonomous speech contents is required in Step S21, the SNS-robot collaboration control unit 1001 may update data of the robot autonomous speech only (Step S22). Then, the SNS-robot collaboration control unit 1001 may notify the robot PF device control unit 2021 of the data of the robot autonomous speech only (Step S26). In addition, when the SNS contribution speech contents need updating in Step S23, the SNS-robot collaboration control unit 1001 may update the data of the SNS contribution speech only (Step S25). Then, the SNS-robot collaboration control unit 1001 may notify the robot PF device control unit 2021 of the data of the SNS contribution speech only (Step S26).

Figure 4:
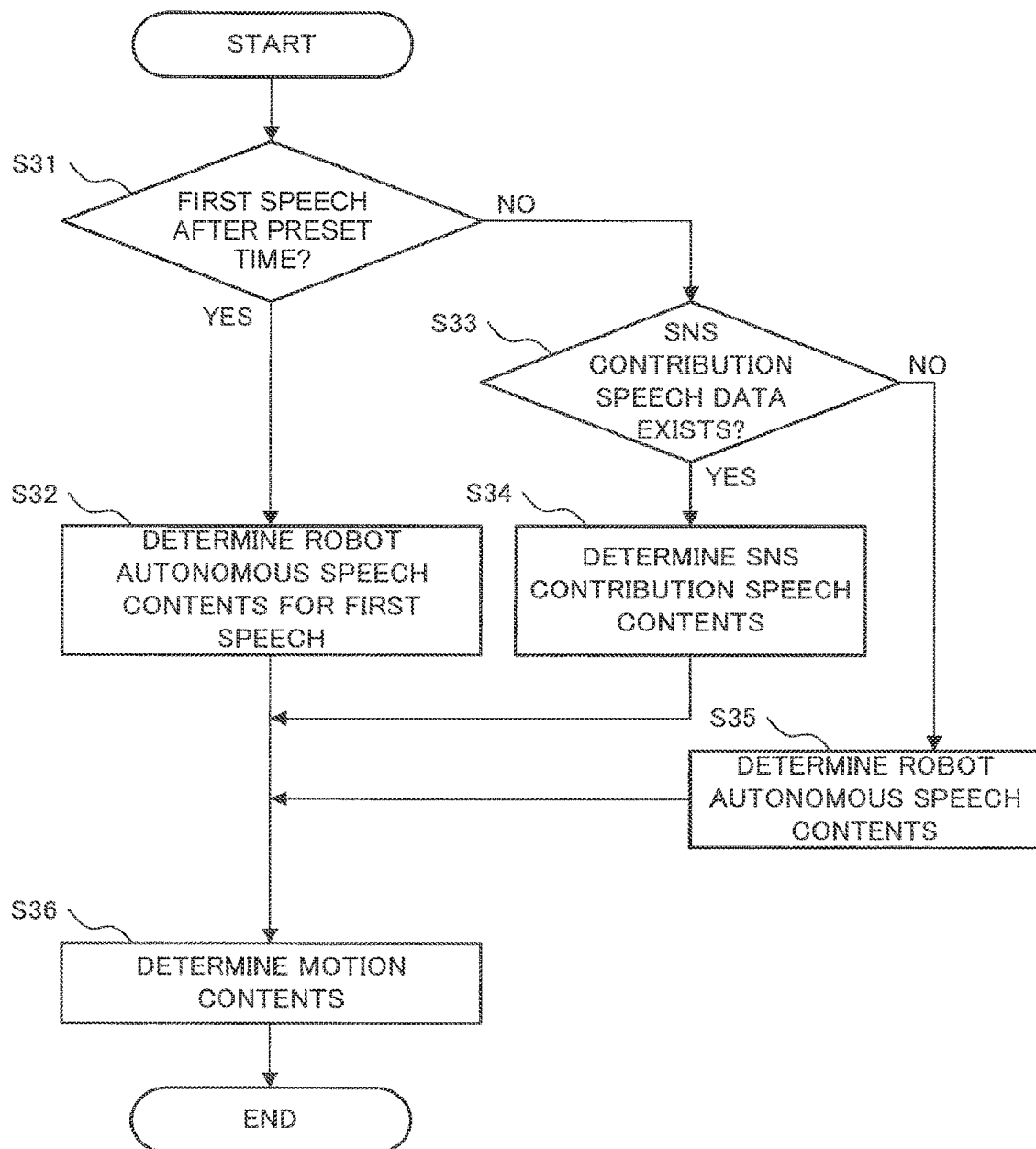
FIG. 4 is a flowchart illustrating a procedure of determining speech contents and motion contents of the communication robot.

Next, description will be made of a procedure of determining communication robot speech contents and motion contents by the robot PF device control unit 2021 at the time of processing of Step S13 depicted in FIG. 2. FIG. 4 is a flowchart illustrating a procedure of determining speech contents and motion contents of the communication robot.

The robot PF device control unit 2021 determines whether a speech whose contents are to be determined is a first speech after a preset time (Step S31). The preset time is, for example, 6 o'clock, 12 o'clock, 18 o'clock, etc. The preset time can be variously set by a robot user, a robot manager, a robot service provider, or the like.

When the speech is the first speech after the preset time (YES in Step S31), the robot PF device control unit 2021 determines robot autonomous speech contents for the first speech based on the robot autonomous speech data (Step S32). The robot autonomous speech contents for the first speech are contents which are suited for the first speech after the preset time and include greetings or those intended for confirming a condition of the robot user. The speech is, for example, "Hello, how is your physical condition today? Are you OK?"

When the speech is not the first speech after the preset time (NO in Step S31), the robot PF device control unit 2021 checks whether SNS contribution speech data exists or not (Step S33). When the SNS contribution speech data exists (YES in Step S33), the robot PF device control unit 2021 determines speech contents of the robot based on the SNS contribution speech data (Step S34). The SNS contribution speech data is data generated by the SNS-robot collaboration control unit 1001 according to rules and/or patterns at the time of generating the SNS contribution speech data in Step S24 in FIG. 3.

When SNS contribution speech data does not exist (NO in Step S33), the robot PF device control unit 2021 determines robot speech contents based on the robot autonomous speech data (Step S35). The robot PF device control unit 2021 determines, as the robot autonomous speech contents in Step S35, a speech appropriate as a speech which is not the first one after the preset time and suited in a case of no SNS contribution speech data. The speech is such a speech as speaking to a robot user or communicating something by the robot, and may be, for example, "It is getting cold. Be careful not to catch a cold."

After processing in Step S32, Step S34 or Step S35, the robot PF device control unit 2021 determines motion matching with the speech contents (Step S36). Specifically, the robot PF device control unit 2021 only needs to select motion matching with the speech contents from among motion contents held in advance, for example, sound effects, body movement of the robot, and lighting or blinking of an LED.

In particular, when the robot speech contents are an SNS contribution speech determined in Step S34, the robot PF device control unit 2021 selects a motion matched to the contents of status icons or stamps, or selects a motion so as to be matched to a text sentence.

Alternatively, in Step S36, the robot PF cloud control unit 2011 or the SNS-robot collaboration control unit 1001, in place of the robot PF device control unit 2021, may determine motion contents based on speech contents. Then, the robot PF cloud control unit 2011 or the SNS-robot collaboration control unit 1001 may notify the robot PF device control unit 2021 of the determined contents. When the SNS-robot collaboration control unit 1001 determines motion contents, the motion contents may be determined together with speech contents based, for example, on SNS contribution contents, and the like.

Figure 5:
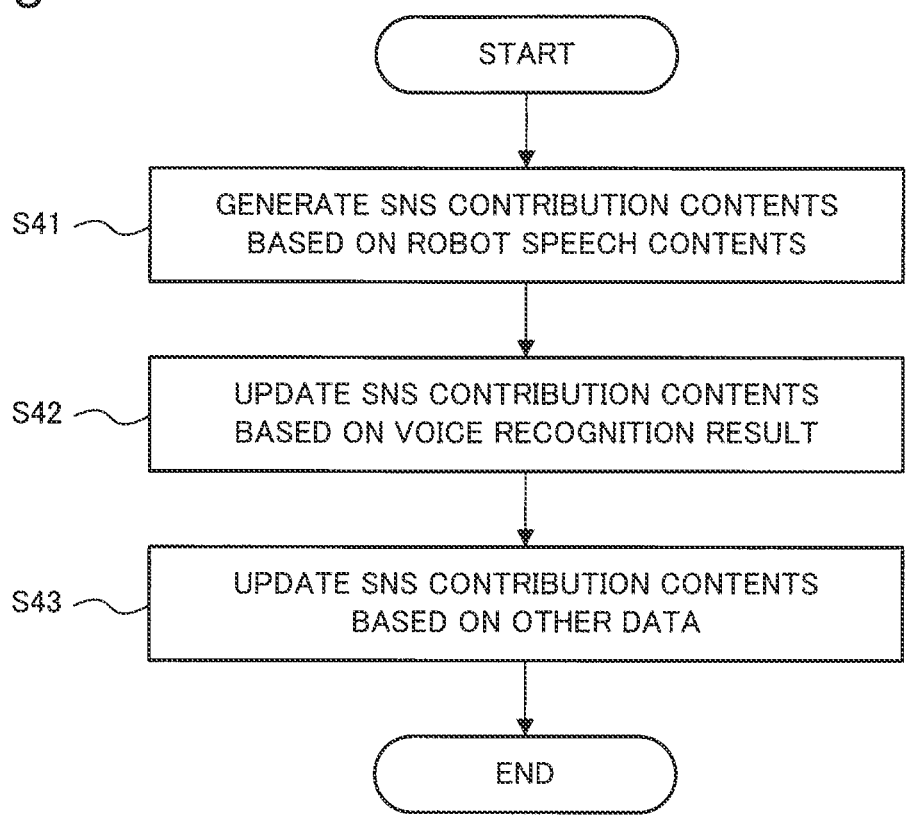
FIG. 5 is a flowchart illustrating a procedure of determining contents contributed by a virtual robot character in an SNS group.

Next, description will be made of a procedure of determining, in Step S16 in FIG. 2 by the SNS-robot collaboration control unit 1001, contents to be contributed by the virtual robot character in an SNS group based on the sensing data and the device data. FIG. 5 is a flowchart illustrating a procedure of determining contents to be contributed by the virtual robot character in the SNS group.

The SNS-robot collaboration control unit 1001 generates SNS contribution contents based on the robot speech contents determined in Step S32, Step S34 or Step S35 depicted in FIG. 4. In the following, a procedure of generating SNS contribution contents based on speech contents will be specifically described.

The SNS-robot collaboration control unit 1001 generates a text sentence to be contributed by referring to robot speech contents irrespective of whether the robot speech contents are determined by processing in Step S32, Step S34, or Step S35 (Step S41).

When speech contents are determined in Step S32, the speech contents are speeches including greetings and those intended for confirming a robot user's condition. Therefore, the SNS-robot collaboration control unit 1001 generates a status contribution indicative of a state of a robot user as SNS contribution contents by the virtual robot character in SNS in Step S41.

When speech contents are determined in Step S34, the speech contents are a contribution by another SNS user. Therefore, the SNS-robot collaboration control unit 1001 takes a response (e.g. speech) of a robot user to the SNS contribution contents by another SNS user as an SNS contribution by a virtual robot character in Step S41. The SNS contribution generated in this case is a comment contribution by the virtual robot character for a status contribution which is made by another SNS user and for which the robot made a speech. The SNS contribution generated in this case is a comment contribution by the virtual robot character in response to a comment contribution which was made by another SNS user and for which the robot made a speech.

When speech contents are determined in Step S35, the speech contents are not such a speech as for confirming a state of the robot user but a speech for speaking to a robot user, or communicating something by the robot. Therefore, the SNS-robot collaboration control unit 1001 generates a comment contribution by the virtual robot character in response to the status contribution (indicative of a robot user's state) as SNS contribution contents in Step S41.

The SNS-robot collaboration control unit 1001 updates the SNS contribution contents based on a recognition result of user's voice obtained by the voice recognition unit 2023 (Step S42). The SNS-robot collaboration control unit 1001 selects an icon to be contributed according to, for example, the recognition result of the user's voice. The SNS-robot collaboration control unit 1001 also updates an SNS contribution text sentence in a manner of adding the voice recognition result to the contribution text sentence generated in Step S41 with reference to the text contents subjected to voice recognition.

When the speech contents are determined in Step S32, the SNS-robot collaboration control unit 1001 selects an icon indicative of a user's state as a status icon of a status contribution by the virtual robot character. Even when no voice recognition succeeded or when no normal voice recognition succeeded, the SNS-robot collaboration control unit 1001 may select a status icon indicative of a condition of the voice recognition or update the voice recognition condition as a contribution text sentence.

When the speech contents are determined in Step S34 or Step S35, the SNS-robot collaboration control unit 1001 selects a stamp to be contributed in addition to a comment contribution by the virtual robot character. Even when no voice recognition succeeded or when no normal voice recognition succeeded, the SNS-robot collaboration control unit 1001 may select a stamp indicative of a condition of the voice recognition or update a contribution text sentence as indicative of the condition of the voice recognition.

Next, based on other sensing data or device data, the SNS-robot collaboration control unit 1001 updates the contribution text sentence in a manner of adding the voice recognition result to the contribution text sentence generated in Step S42 (Step S43). Specifically, the SNS-robot collaboration control unit 1001 makes a contribution which reports a user's condition based on the sensing data or the device data. When utilizing the sensing data of person sensing, the SNS-robot collaboration control unit 1001 may just execute update when, for example, a person is sensed as a result of normal detection of his or her face. The SNS-robot collaboration control unit 1001 may also execute update when a person is sensed only with ultrasonic waves. The SNS-robot collaboration control unit 1001 may also execute update when a temperature information change or an abnormal temperature of a robot user's body is sensed. For example, the SNS-robot collaboration control unit 1001 extracts a characteristic change from any kind of sensing data and updates a contribution text sentence based on the extracted change. The SNS-robot collaboration control unit 1001 may utilize a distance a positional relationship between a robot and a robot user.

When sensing a room temperature being T1 degrees centigrade, for example, the SNS-robot collaboration control unit 1001 makes such a contribution as "Room temperature is T1 degrees centigrade. It is a little cold, isn't it?" When sensing a body temperature of a user being T2 degrees centigrade, for example, the SNS-robot collaboration control unit 1001 makes such a contribution as "Body temperature is T2 degrees centigrade." For example, when sensing that a distance between the user and the communication robot is D cm (centimeter) and detecting a face in a diagonally 60 degrees left forward direction from the robot, the SNS-robot collaboration control unit 1001 makes such a contribution as "Distance to the user is D cm. In a diagonally forward ten o'clock direction, the face is found." When person sensing of Step S12 does not succeed for a preset time period, the SNS-robot collaboration control unit 1001 may make such a contribution as "No one seems to be there. What happens?" In this case, the SNS-robot collaboration control unit 1001 may make such a contribution as "The room temperature is T1 degrees centigrade. It is too cold. There seems to be no heating."

Next, effects of the collaboration system of the present exemplary embodiment will be described. The collaboration system of the present exemplary embodiment enables a person not using a PC or a smart phone to join in an SNS community (i.e. SNS group) and communicate with another SNS user with ease just by conversation with a robot.

In the collaboration system of the present exemplary embodiment, the communication robot, as a virtual robot character, contributes contents of conversation with a robot user or sensing information such as movement of the robot user to SNS so that they can be shared. This enables another user (e.g. a family member or a friend) even at a distant place who takes part in the same community to check words and actions of the robot user.

In the collaboration system of the present exemplary embodiment, a virtual robot character of the same kind as that of a real-world robot takes part in an SNS community. Therefore, the collaboration system of the present exemplary embodiment enables real-world living space of a robot user to be reported to another user of the SNS community in a real and easy-to-understand manner.

When sharing words and actions of a robot user on SNS, the collaboration system of the present exemplary embodiment discriminates contents that the user wants to share with another user relatively intensively and contents that the user wants to share relatively weakly and uses different UIs (i.e. ways of showing) on SNS. The contents to be shared relatively intensively with another user are, for example, status contributions and contents to be shared relatively weakly are, for example, comment contributions. This allows the collaboration system of the present exemplary embodiment to report words and actions of a robot user to another user in an easy-to-understand manner according to conditions. In addition, the collaboration system of the present exemplary embodiment is capable of accumulating histories of words and actions of a robot user only through conversation with a robot by the robot user.

First Implementation Example

A first implementation example of the collaboration system of the present exemplary embodiment will be described. In the present implementation example, the communication robot identifies a plurality of persons by utilizing a face authentication technology. By specifying an SNS group to which a contribution is to be made based on a result of the face authentication or the like, the collaboration system achieves conversation suitable for an identified person, a contribution in SNS and sharing of the contribution. In addition, the collaboration system of the present implementation example may specify not only an SNS group but also the SNS system 300 based on a result of face authentication or the like.

Figure 6:
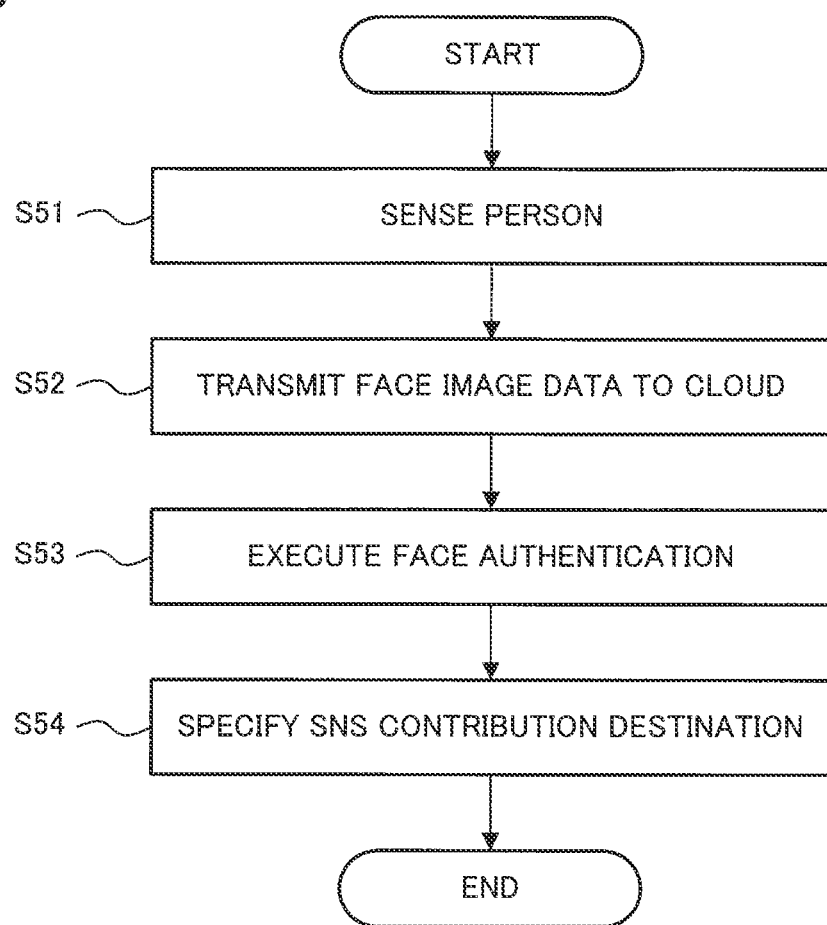
FIG. 6 is a flowchart illustrating a procedure of identifying an SNS contribution destination by face authentication.

FIG. 6 is a flowchart illustrating a procedure of identifying an SNS contribution destination using face authentication. The person sensing unit 2022 of the robot PF device 202 senses a person (Step S51). Specifically, the person sensing unit 2022 senses a presence, a position, movement, and an expression change of a person, a temperature change, and the like. The person sensing unit 2022 notifies the robot PF device control unit 2021 of the sensing data acquired by the sensing. The robot PF device control unit 2021 determines whether a person different from a person sensed immediately before is sensed or not. The robot PF device control unit 2021 may, for example, detect a face (e.g. a region including the face) in a photographed image and compare the detected face and the face detected immediately before, thereby determining whether a person different from a person sensed immediately before is sensed or not. The robot PF device control unit 2021 may just make this determination just by such simple identification of a person. Since face authentication for final identification of a person is executed by the robot PF cloud 201, person identification at the robot PF device 202 is not necessarily be executed strictly.

The robot PF device control unit 2021 transmits face image data to the robot PF cloud control unit 2011 when the person sensed in Step S51 is different from the person sensed immediately before (Step S52).

The reason why the robot PF device 202 executes simple identification of a person in Step S51 is to transmit face image data to the robot PF cloud control unit 2011 with an appropriate frequency to specify an SNS contribution destination in Step S52. In other words, it is intended to suppress an increase in a load on a communication network caused by an increase in a transmission frequency and to suppress a decrease in a system response of the collaboration system.

The robot PF cloud control unit 2011 executes face authentication based on the face image data received from the robot PF device control unit 2021 (Step S53). The robot PF cloud control unit 2011 holds, as face authentication management data, the face image data and identification information of a robot user (i.e. robot user ID (Identification)) so that they are correlated with each other. The robot PF cloud control unit 2011 specifies a robot user ID by matching the face authentication management data registered in advance with the received face image data in the face authentication. Alternatively, the SNS-robot collaboration control unit 1001 may hold the face authentication management data and specify a robot user ID. The robot PF cloud control unit 2011 notifies the SNS-robot collaboration control unit 1001 of a robot user ID as a result of the face authentication. Since the face authentication is commonly used, specific description of the procedure thereof will be omitted.

The SNS-robot collaboration control unit 1001 holds SNS user management data in which identification information of a robot user (e.g. the above-described robot user ID) and an SNS group as a contribution destination are correlated with each other. As an SNS group suited as a contribution destination for a robot user, the SNS-robot collaboration control unit 1001 specifies an SNS group correlated with the robot user ID acquired by face authentication in the SNS user management data (Step S54). Then, the SNS-robot collaboration control unit 1001 makes a contribution to the specified SNS group suited for the robot user. The SNS-robot collaboration control unit 1001 also generates a speech from a contribution by another SNS user of the SNS group, and notifies the robot PF device control unit 2021 of the generated speech contents. When two or more of SNS systems 300 exist, in Step S54, the SNS-robot collaboration control unit 1001 may specify not only an SNS group to which a contribution is to be made but also the SNS system 300 to which the contribution is to be made. In this case, the SNS-robot collaboration control unit 1001 may hold data in which the SNS group and the SNS system 300 are correlated with each other. The SNS-robot collaboration control unit 1001 may specify an SNS system 300 correlated with the specified SNS group as a contribution destination SNS system 300.

The collaboration system according to the present implementation example enables two or more users to share contributions or information in their respective SNS groups to which the users belong and in the SNS systems 300 only through conversation with the communication robot without designating an SNS group or the like. The reason is that use of face authentication by an associated system enables an SNS contribution destination suited for a robot user to be specified.

Second Implementation Example

Figure 7:
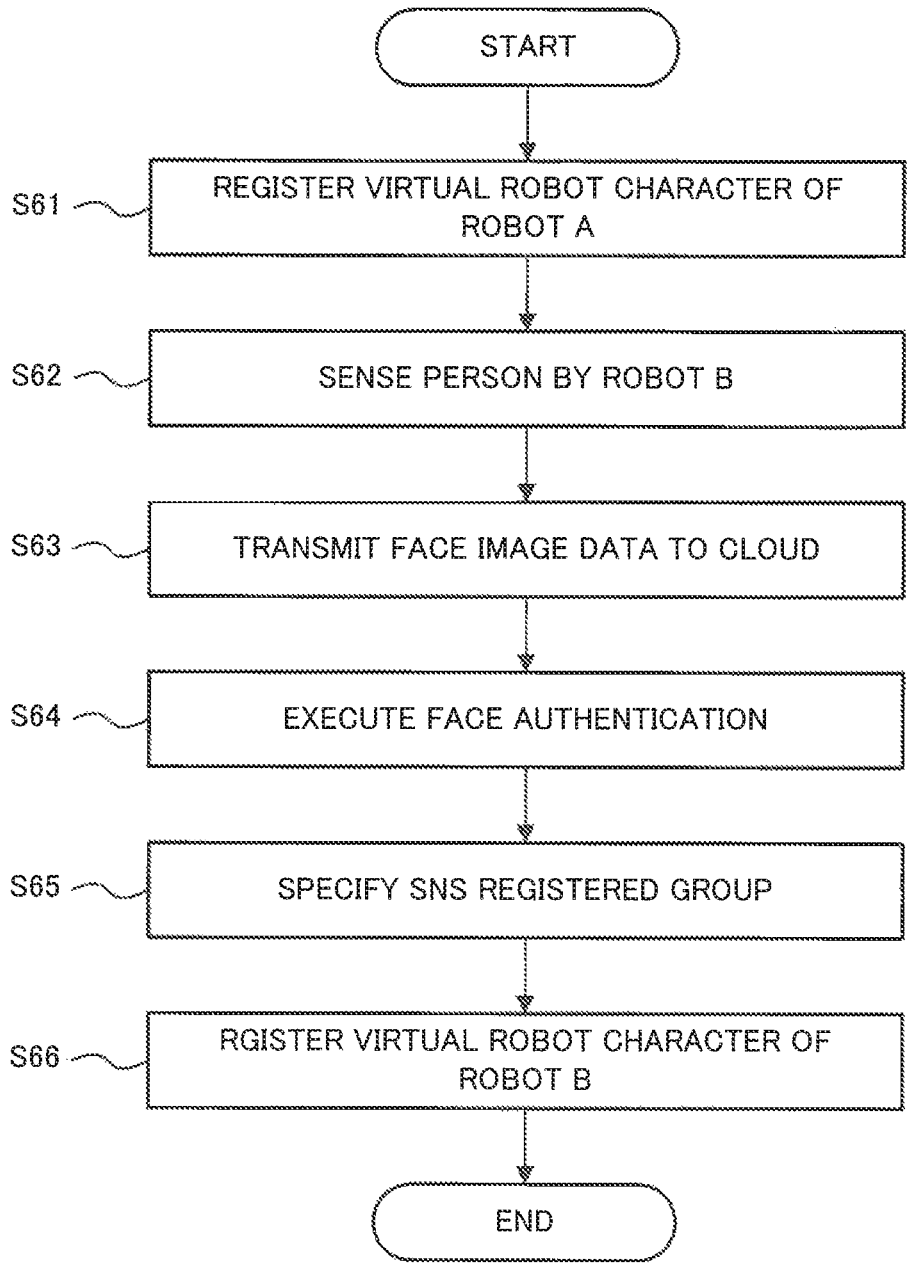
FIG. 7 is a flowchart illustrating a procedure of identifying a contribution destination when a plurality of communication robots is provided.

As second implementation example of the collaboration system according to the present exemplary embodiment, description will be made of a collaboration system by which a plurality of robots used by a robot user are registered with (i.e. join in) an SNS group without the robot user executing operations of registration of the robots with the SNS group. FIG. 7 is a flowchart illustrating a procedure of specifying a contribution destination when there is a plurality of communication robots.

The SNS-robot collaboration control unit 1001 registers a certain robot A as a virtual robot character with an SNS group (Step S61). Assume, for example, that the robot A at a certain individual home is registered as a virtual robot character with a certain SNS group. The SNS-robot collaboration control unit 1001 holds the user management data in which identification information of a robot user (robot user ID) and an SNS group to which a contribution is to be made are correlated with each other. The SNS-robot collaboration control unit 1001 specifies the certain SNS group on the basis of robot user ID acquired by face authentication and the SNS user management data. Then, conversation between the robot A and the user is shared in the certain SNS group correlated with the robot user ID of the robot A.

Next, description will be made of a case where a user of the robot A (e.g. who owning the robot A) holds a conversation with, for example, another robot B, which is other than the robot A which the user A owns personally, in other home, in other shop or in town. The person sensing unit 2022 of the robot PF device 202 of the robot B senses a person (Step S62). The person sensing unit 2022 notifies the robot PF device control unit 2021 of the face image data acquired through person sensing.

The robot PF device control unit 2021 of the robot B transmits the face image data of the person sensed in Step S62 to the robot PF cloud control unit 2011 (Step S63).

Using the face image data received from the robot PF device control unit 2021, the robot PF cloud control unit 2011 executes face authentication (Step S64). Then, the robot PF cloud control unit 2011 notifies the SNS-robot collaboration control unit 1001 of the robot user ID as a result of the face authentication.

The SNS-robot collaboration control unit 1001 specifies an SNS group correlated with the robot user ID on the basis of the robot user ID acquired by the face authentication and the user management data (Step S65). In other words, the SNS-robot collaboration control unit 1001 specifies an SNS group in which the robot A that the user personally owns is registered.

The SNS-robot collaboration control unit 1001 registers the robot B as a virtual robot character with the SNS group specified in Step S65 (Step S66).

The collaboration system of the present implementation example enables a plurality of communication robots to be registered with (i.e. to be joined in) an SNS group without executing a particular registration procedure when a user holds a conversation with the plurality of communication robots.

The collaboration system of the present implementation example can be combined with image and video contributions or a contribution of position information, which are possible in common SNS. By such a combination, it is possible to achieve an automatic check-in system which allows a person who holds conversation with a plurality of communication robots to automatically check in an SNS group just by holding the conversation. Execution of the automatic check-in enables a user to grasp and share, in the SNS group, position information, and words and actions (i.e. what and where he or she is doing now) of a person who holds the conversation with the robot.

There is also a possibility that a communication robot or a sensor device is registered as a plurality of virtual robot characters with SNS and joins in the SNS, so that making a speech by the plurality of virtual robot characters might confuse a robot user. On that account, a robot user may determine a main virtual robot character for each SNS group in advance. Then, the main virtual robot character may make a speech of conversation between the virtual robot characters on behalf of them. The main virtual robot character may contribute information acquired from the plurality of registered robots to SNS.

Figure 8:
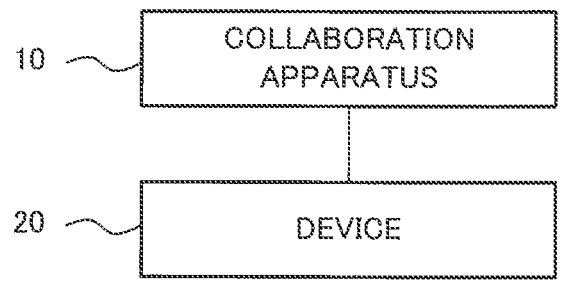
FIG. 8 is a block diagram illustrating a structure of a main part of the collaboration system according to the present invention.

Next, the outline of the collaboration system according to the present invention will be given. FIG. 8 is a block diagram illustrating a structure of a main part of the collaboration system according to the present invention. The collaboration system according to the present invention includes a device 20 and a collaboration apparatus 10 as main components. The device 20 recognizes a user, and executes at least one of acquisition of sensing data related to the user and an action based on contents contributed to SNS by another user. The collaboration apparatus 10 executes at least one of processing of transmitting contributed contents based on the sensing data to an SNS system which provides the SNS and processing of updating action of the device 20 based on contents contributed by another user and transmitting the updated action to the device 20.

The SNS-robot collaboration apparatus 100 of the present exemplary embodiment can be achieved by a computer and a program which controls the computer, dedicated hardware, or a combination of a computer and a program which controls the computer and dedicated hardware.

Figure 9:
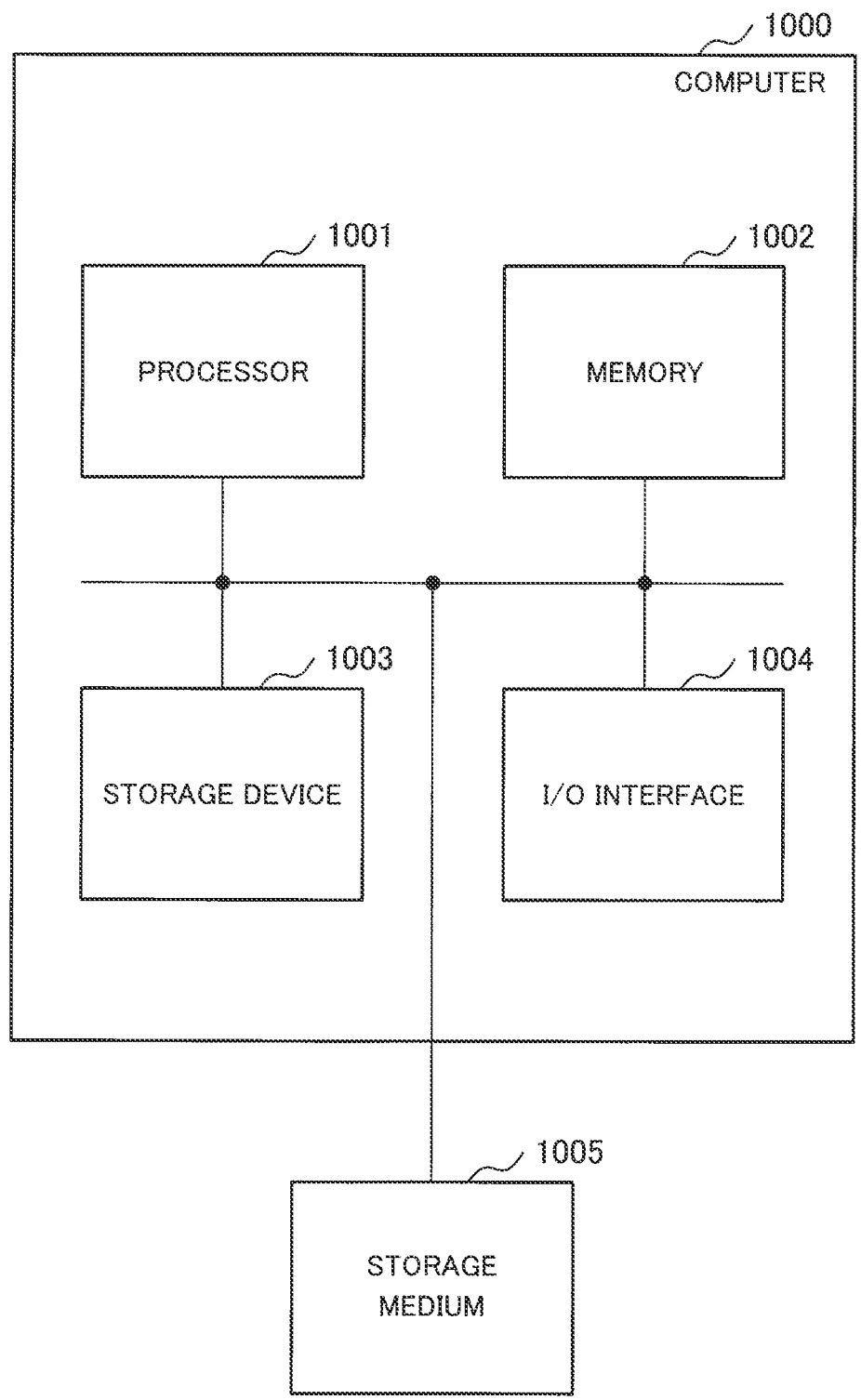
FIG. 9 is a block diagram illustrating one example of a hardware structure of a computer by which an SNS-robot collaboration apparatus 100 according to the present invention can be achieved.

FIG. 9 is a diagram illustrating one example of a hardware structure of a computer 10000 by which an SNS-robot collaboration apparatus 100 can be achieved. Referring to FIG. 9, the computer 10000 includes a processor 10001, a memory 10002, a storage device 10003 and an I/O (Input/Output) interface 10004. The computer 10000 is capable of accessing a recording medium 10005. The memory 10002 and the storage device 10003 are storage devices such as a RAM (Random Access Memory) or a hard disk. The recording medium 10005 is a storage device such as a RAM or a hard disk, a ROM (Read Only Memory), or a portable recording medium. The storage device 10003 may be a storage medium 10005. The processor 10001 is capable of reading and writing data or program from or to the memory 10002 and the storage device 10003. The processor 10001 is capable of accessing, for example, the robot PF 200 and the SNS system 300 through the I/O interface 10004. The processor 10001 is capable of accessing the storage medium 10005. A program which causes the computer 10000 to operate as the SNS-robot collaboration apparatus 100 is stored in the storage medium 10005.

The processor 10001 loads the program which is stored in the storage medium 10005 and causes the computer 10000 to operate as the SNS-robot collaboration apparatus 100 into the memory 10002. Then, as a result of the execution of the program loaded into the memory 10002 by the processor 10001, the computer 10000 operates as the SNS-robot collaboration apparatus 100.

The SNS-robot collaboration control unit 1001, the robot PF-IF unit 1002 and the SNS-IF unit 1003 can be achieved, for example, by a dedicated program which is read into the memory 10002 from the recording medium 10005 storing a program and by which functions of the respective units can be achieved, and by the processor 10001 which executes the program. In addition, a part or all of the SNS-robot collaboration control unit 1001, the robot PF-IF unit 1002 and the SNS-IF unit 1003 can be achieved by dedicated circuits which realize these functions.

Although the present invention has been described with reference to the exemplary embodiments in the foregoing, the present invention is not limited to the above-described exemplary embodiments. Various modifications those skilled in the art can appreciate may be made in configuration and details of the present invention without departing from the scope of the present invention.

In each of the above-described exemplary embodiments, a collaboration system set forth in the following (1) to (6) is also disclosed.

(1) A collaboration system including a device (e.g. the robot PF device 202) and a collaboration apparatus (e.g. the SNS-robot collaboration apparatus 100). The device recognizes a user, and executes at least one of acquisition of sensing data related to the user and an action (e.g. speech and motion) based on contents contributed to SNS by another user. The collaboration apparatus executes at least one of processing of transmitting contributed contents based on the sensing data to an SNS system (e.g. SNS system 300) and processing of updating action of the device based on contents contributed by another user and transmitting the updated action to the device. The SNS system provides SNS.

(2) The collaboration system may be configured such that the device is a communication robot capable of communicating with a user. Thus configured collaboration system enables a person not using a PC or a smart phone to take part in an SNS community (i.e. SNS group) and communicate with another SNS user with ease just by conversation with a robot.

(3) The collaboration system may be configured as set forth below. The collaboration apparatus updates at least one of speech contents and motion of a device based on contents contributed by another user in SNS. The device executes at least one of a speech based on the updated speech contents and a motion based on the updated motion.

(4) The collaboration system may be configured such that the device acquires user's voice as sensing data, and that the collaboration apparatus determines contents to be transmitted to the SNS system based on a recognition result of the voice.

(5) The collaboration system may be configured such that the device acquires sensing data related to a condition of the user, and that the collaboration apparatus transmits a contribution to the SNS system for reporting a user's condition based on the sensing data.

(6) The collaboration system can be configured such that the device acquires a face image of a user, and that the collaboration apparatus identifies a contribution destination based on identification information of a user specified based on an authentication result of the face image and user management data held in advance. According to such a collaboration system, it is possible for two or more users to share, just by holding conversation with a communication robot, contributions or information in their respective SNS groups to which the users belongs.

(7) The collaboration system may be configured as set forth below. The collaboration apparatus holds user management data in which identification information of a user using a first device is associated with an SNS group, and when a second device recognizes the user, registers the second device for an SNS group correlated with the user. According to such collaboration system, it is possible for the user to register autonomously register with the SNS group just by conversation of a user with the plurality of communication robots.

Although the present invention has been described with reference to the exemplary embodiments in the foregoing, the present invention is not limited to the above-described exemplary embodiments. Various modifications those skilled in the art can appreciate may be made in configuration and details of the present invention without departing from the scope of the present invention.

This application is based upon and claims the benefit of priority from Japanese Patent Application No. 2014-078683, filed on Apr. 7, 2014, the disclosure of which is incorporated herein in its entirety by reference.

REFERENCE SIGNS LIST

10 Collaboration apparatus
20 Device
100 SNS-robot collaboration apparatus
200 Robot PF
201 Robot PF cloud
202 Robot PF device
300 SNS system
301 SNS server
302 Terminal device
1001 SNS-robot collaboration control unit
2011 Robot PF cloud control unit
2021 Robot PF device control unit
2022 Person sensing unit
2023 Voice recognition unit
2024 Voice synthesis speech unit
2025 Motion reproduction unit
3011 SNS server control unit
3021 SNS application
10000 Computer
10001 Processor
10002 Memory
10003 Storage device
10004 I/O Interface
10005 Storage medium

The invention claimed is:

1. A collaboration system comprising:
a first device which recognizes a user and acquires sensing data related to the user;
a collaboration apparatus communicably connected with the first device, the collaboration apparatus configured to determine in advance a main virtual character for a group in a Social Networking Service (SNS) provided by a SNS system, and execute transmission to the SNS system of a first content based on the sensing data, as speech, by the main virtual character and on behalf of a first virtual character representing the first device and registered as a member of the group; and
a second device communicably connected with the collaboration apparatus and comprising a camera, wherein
the collaboration apparatus is configured to:
hold user management data in which identification information of the user of the first device is associated with the group; and
register, when the second device recognizes the user, a second virtual character representing the second device with the group associated with the identification information of the user, wherein
the second device obtains information on the user when the second device recognizes the user,
the collaboration apparatus is further configured to execute transmission to the SNS system of a second content based on the information on the user, by the main virtual character and on behalf of the second virtual character,
the first device performs an action based on the second content,
the second device is configured to:
hold face authentication management data in which of a registered face of the user is associated with the identification information of the user;
identify the identification information of the user by collating a face captured by the camera with the registered face, and
the collaboration apparatus is configured to identify the group associated with the identified identification information as the group which the second virtual character is to be registered with.

2. The collaboration system according to claim 1, wherein
the second device is configured to acquire second sensing data by sensing the user, and
the collaboration apparatus is further configured to contribute text data based on the second sensing data, as speech, by the main virtual character to the group.

3. The collaboration system according to claim 1, wherein the second device is placed in a public place.

4. The collaboration apparatus according to claim 1, wherein
the action based on the second content is at least one of speech by speech generation and performance of a motion.

5. A collaboration method performed by a collaboration apparatus communicably connected with a first device and a second device comprising a camera, the first device being configured to recognize a user and acquires sensing data related to the user, the collaboration method comprising:
executing determination in advance of a main virtual character for a group in a Social Networking Service (SNS) provided by a SNS system, and transmission to the SNS system of a first content based on the sensing data, as speech, by the main virtual character and on behalf of a first virtual character representing the first device and registered as a member of the group;
holding user management data in which identification information of the user of the first device is associated with the group; and
registering, when the second device recognizes the user, a second virtual character representing the second device with the group associated with the identification information of the user, wherein
the second device obtains information on the user when the second device recognizes the user,
the method further comprises executing transmission to the SNS system of a second content based on the information on the user, by the main virtual character and on behalf of the second virtual character,
the first device performs an action based on the second content,
the second device is configured to:
hold face authentication management data in which of a registered face of the user is associated with the identification information of the user;
identify the identification information of the user by collating a face captured by the camera with the registered face, and
the collaboration method comprises identifying the group associated with the identified identification information as the group which the second virtual character is to be registered with.

6. The collaboration method according to claim 5, wherein
the second device is configured to acquire second sensing data by sensing the user, and
the collaboration method further comprises contributing text data based on the second sensing data, as speech, by the main virtual character to the group.

7. The collaboration method according to claim 5, wherein the second device is placed in a public place.

8. A non-transitory computer-readable storage medium storing a program that causes a computer to perform a collaboration method, the computer being communicably connected with a first device and a second device comprising a camera, the first device being configured to recognize a user and acquires sensing data related to the user, the collaboration method comprising:
determining in advance a main virtual character for a group in a Social Networking Service (SNS) provided by a SNS system, and executing transmission to the SNS system of a first content based on the sensing data, as speech, by the main virtual character and on behalf of a first virtual character representing the first device and registered as a member of the group;
holding user management data in which identification information of the user of the first device is associated with the group; and
registering, when the second device recognizes the user, a second virtual character representing the second device with the group associated with the identification information of the user, wherein
the second device obtains information on the user when the second device recognizes the user,
the collaboration method further comprises executing transmission to the SNS system of a second content based on the information on the user, by the main virtual character and on behalf of the second virtual character,
the first device performs an action based on the second content, the second device is configured to:
hold face authentication management data in which of a registered face of the user is associated with the identification information of the user;
identify the identification information of the user by collating a face captured by the camera with the registered face, and
the collaboration method comprises identifying the group associated with the identified identification information as the group which the second virtual character is to be registered with.

9. The storage medium according to claim 8, wherein
the second device is configured to acquire second sensing data by sensing the user, and
the collaboration method further comprises contributing text data based on the second sensing data, as speech, by the main virtual character to the group.

10. The storage medium according to claim 8, wherein the second device is placed in a public place.

* * * * *